United States Patent Office
3,205,222
Patented Sept. 7, 1965

3,205,222
CERTAIN 2-AMINO-7-HALO-3H-BENZ(d)AZEPINES
Francis Johnson, Newton Lower Falls, and Wilmonte A. Nasutavicus, Framingham, Mass., assignors to The Dow Chemical Company, Midland, Mich., a corporation of Delaware
No Drawing. Filed Mar. 19, 1963, Ser. No. 266,205
16 Claims. (Cl. 260—239)

The present invention relates to novel benzazepine compounds.

It is an object of this invention to provide novel benzazepine compounds an a process for preparing said compounds.

We discovered that novel hydrohalide salts of 2-amino-7-halo-3H-benz(d)azepines are produced by reacting a 2,3-di(cyanomethyl)benzene with a dry halogen acid. The preparation is schematically illustrated as follows:

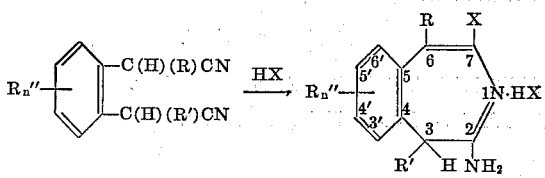

The free bases are produced from the hydrohalide salts by neutralization in an aqueous mineral acid or base. The free bases have the following structure:

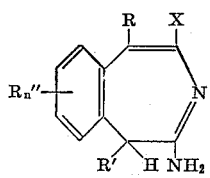

R and R' are preferably hydrogen. They may also be lower alkyl or monocyclicaryl.

The reactant dicyanomethyl benzene and the corresponding product may contain one or more additional substituents on the benzene nucleus at its 3',4',5', and/or 6' positions (collectively represented by R" in the formula). The substituents on the benzene nucleus available are those known to the art. To avoid undesirable side reactions they should not react with the hydrogen halide and/or solvent and/or product in the instant reaction mixture. Such substituents include the following groups: alkyl, nitro, oxo, dialkylamine, sulfonate, alkoxy, halo, carboxyl, trifluoromethyl, ester, etc. The preferred azepines are those which are not substituted or which contain one or two halogen, loweralkyl, loweralkoxy, halo, carboxyl, or ester substituents, and $n$ is one to four; preferably one or two. When $n$ is one, two unsymmetrical products result, because the cyclization would take place in both directions, as illustrated below:

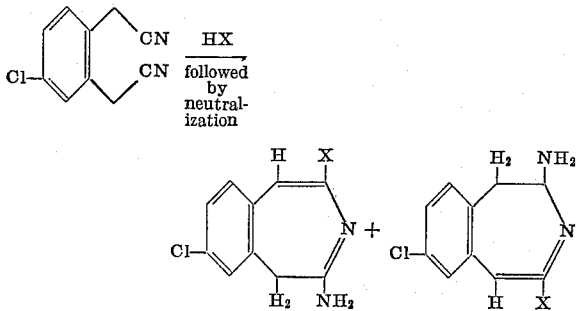

The cyclization is carried out by the reaction of the dicyanomethyl benzene with a dry halogen acid, such as, hydrogen chloride, hydrogen bromide, or hydrogen iodide. The reaction is carried out in an inert solvent which may be polar or non-polar and includes acetic acid, propionic acid, ethers generally, methylene chloride, chloroform, benzene, etc. The preferred solvents are acetic acid, ether, benzene and methylene chloride. The cyclization is preferably carried out using two or more equivalents of the appropriate halogen acid. Less than two equivalents leads to incomplete conversion. Halogen acid in excess of two equivalents has no adverse effects on the reaction. The reaction goes to completion quickly and is not materially affected by temperature or pressure. It is preferably carried out at ambient temperatures and pressures for convenience. Reaction time of up to two hours are preferred with the equipment utilized to date. The benzazepines are obtained from the reaction mixture and purified by known separatory and purification techniques.

The 2-amino-7-halo-3H-benz(d)azepines may be modified by standard techniques. The bromine substituted compound may have the bromine atom replaced with an iodine atom by reaction with sodium iodide in a solvent. One or both hydrogen atoms on the amine nitrogen atom may be replaced with alkyl groups, acyl groups, etc., by standard techniques.

For the purpose of further illustrating the invention to those skilled in the art, the following illustrative examples are given:

*Example I.*—2-amino-7-bromo-3H-benz(d)azepine 1,2-di(cyanomethyl)benzene (31.2 g.) was treated at room temperature with hydrogen bromide in acetic acid (12 ml., 30% HBr). After stirring for 30 minutes a large yellow precipitate appeared. Stirring was continued for 2 hours and the solid (the hydrobromide salt of the title compound) removed by filtration, and washed with acetic acid and ether. The almost white solid (5.7 g.) was stirred for a short period with a saturated solution of sodium hydrogen carbonate. The solid was then removed by filtration, washed with water and dried. The solid (3.7 g.) was then recrystallized from ethyl acetate to give the title compound (3.10 g.) M.P. 183°.

Found: C, 50.8%; H, 3.8%; Br, 33.5%; N, 12.1%. Required for $C_{10}H_9N_2Br$: C, 50.7%; H, 3.8%; Br, 33.7%; N, 11.8%.

*Example II.*—2-amino-7-iodo-3H-benz(d)azepine

Following the procedure of Example I, 1,2-di(cyanomethyl)benzene (13.0 g.) when treated with hydrogen iodide in acetic acid (50 ml.; 13% HI) led to 2-amino-7-iodo-3H-benz(d)azepine (8.4 g.) M.P. 191–193° C.

Found: C, 42.4%; H, 3.1%; I, 44.7%; N, 9.8%. Required for $C_{10}H_9N_2Br$: C, 42.3%; H, 3.2%; I, 44.7%; N, 9.9%.

The following substituted 2-amino-7-halo-3H-benz(d) azepines are prepared following the procedure of the aforenoted examples, using the corresponding 1,2-di(cyanomethyl)benzene reactants:

2-amino-7-chloro-3H-4',5'-dimethoxybenz(d)azepine
2-amino-7-bromo-3H-3',6'-dichlorobenz(d)azepine
2-amino-7-bromo-3H-4',5'-dichlorobenz(d)azepine
2-amino-7-bromo-3H-3',6'-dibromobenz(d)azepine
2-amino-7-bromo-3H-3',4',5',6'-tetrachlorobenz(d)azepine
2-amino-7-bromo-3H-4',5'-dicarboxybenz(d)azepine
2-amino-7-bromo-3H-4',5'-diethylbenz(d)azepine
2-amino-7-bromo-3H-4',5'-dimethylbenz(d)azepine
2-amino-7-bromo-3H-4',5'-methylenedioxybenz(d)azepine
2-amino-3,6-dimethyl-7-bromo-3H-benz(d)azepine
2-amino-3,6-diphenyl-7-bromo-3H-benz(d)azepine The 2-amino-7-halo-3H-benz(d)azepines are useful as cockroach poisons and inhibitors of plum curculio.

As many embodiments of this invention may be made without departing from the spirit and scope thereof, it is to be understood that the invention includes all such modifications and variations as come within the scope of the appended claims.

Reference is made to our patent application Serial No. 266,195 directed to 2-amino-7-halo-3H-naphth(d)azepines, filed of even date herewith, which is made a part hereof.

What is claimed is:
1. A compound of the formula:

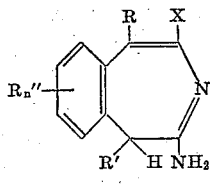

wherein $n$ is a whole number from 1 to 4;

R and R′ are selected from the group consisting of hydrogen, loweralkyl, and phenyl;

R″ is selected from the group consisting of loweralkyl, loweralkoxy, halo, and carboxyl groups; and X is selected from the group consisting of chlorine, bromine, and iodine.
2. The hydrohalide salts of the compounds of claim 1.
3. 2-amino-7-bromo-3H-benz(d)azepine.
4. 2-amino-7-chloro-3H-benz(d)azepine.
5. 2-amino-7-iodo-3H-benz(d)azepine.
6. 2-amino-7-chloro-3H-4′,5′-dimethoxybenz(d)azepine.
7. 2-amino-7-bromo-3H-3′,6′-dimethoxybenz(d)azepine.
8. 2-amino-7-bromo-3H-4′,5′-dichlorobenz(d)azepine.
9. 2-amino-7-bromo-3H-3′,6′-dibromobenz(d)azepine.
10. 2-amino-7-bromo-3H-3′,4′,5′,6′-tetrachlorobenz(d)azepine.
11. 2-amino-7-bromo-3H-4′,5′-dicarboxybenz(d)azepine.
12. 2-amino-7-bromo-3H-4′,5′-diethylbenz(d)azepine.
13. 2-amino-7-bromo-3H-4′,5′-dimethylbenz(d)azepine.
14. 2-amino-7-bromo-3H-4′,5′-methylenedioxybenz(d)azepine.
15. 2-amino-3,6-dimethyl-7-bromo-3H-benz(d)azepine.
16. 2-amino-3,6-diphenyl-7-bromo-3H-benz(d)azepine.

No references cited.

NICHOLAS S. RIZZO, *Primary Examiner.*
WALTER A. MODANCE, *Examiner.*